Figure 29:
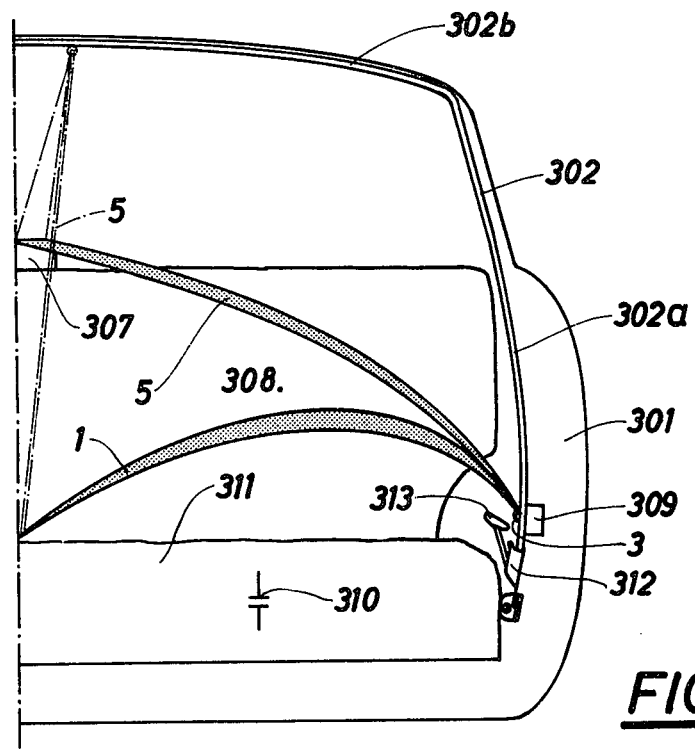

United States Patent [19]
Lindblad

[11] 3,926,455
[45] Dec. 16, 1975

[54] SAFETY BELT ARRANGEMENT FOR INDIVIDUALS

[76] Inventor: Oskar Lennart Lindblad, Hedasgatan 16, 44020 Vargarda, Sweden

[22] Filed: Apr. 5, 1974

[21] Appl. No.: 458,289

Related U.S. Application Data

[62] Division of Ser. No. 179,134, Sept. 9, 1971, Pat. No. 3,822,760.

[30] Foreign Application Priority Data

| Sept. 9, 1970 | Sweden | 12225/70 |
| Sept. 25, 1970 | Sweden | 13045/70 |
| Nov. 2, 1970 | Sweden | 14714/70 |
| Dec. 30, 1970 | Sweden | 17726/70 |
| Feb. 10, 1971 | Sweden | 1694/71 |

[52] U.S. Cl. .......................... 280/150 SB
[51] Int. Cl. .......................... B60r 21/10
[58] Field of Search ............ 280/150 SB; 180/82 C; 297/388, 389

[56] References Cited
UNITED STATES PATENTS

| 2,858,144 | 10/1958 | Oppenheim | 280/150 SB |
| 3,554,577 | 1/1971 | Hane | 280/150 SB |
| 3,583,726 | 6/1971 | Lindblad | 280/150 SB |

*Primary Examiner*—Robert R. Song
*Attorney, Agent, or Firm*—Ulle C. Linton

[57] ABSTRACT

Safety belt arrangement for vehicles which includes belts positioned for extending across the body of a person sitting on a seat in the vehicle with one end of the strap secured to the vehicle on a side of the seat opposite a side wall of the vehicle and the other end of the strap slideably connected on the inside of a door of the vehicle and means for automatically displacing the belt along said door upon operation of the ignition circuit from in front of the seat to across the person.

5 Claims, 2 Drawing Figures

SAFETY BELT ARRANGEMENT FOR INDIVIDUALS

The present invention relates to safety belts for vehicles.

The present application is a divisional application from my co-pending application Ser. No. 179,134 filed Sept. 9, 1871, now U.S. Pat. No. 3,822,760.

One object of the invention is to provide a safety belt which is very simple to put on so that persons using the vehicle will be induced to use the belt during each journey.

Another object of the invention is to provide a safety belt arrangement wherein the belt straps or straps in the position of non use are disposed in such a manner in front of the driver or passenger seat that it will not hinder entrance to the seat but will have to be tightened around the body in order not to cause any obstruction during the journey.

A further object of the invention is to provide a safety belt arrangement in which the straps or straps will automatically close around the driver or passenger after closing the door to the driver or passenger seat respectively, and upon closing an electric circuit.

Still further objects of the invention will be apparent from the following detailed disclosure.

A safety belt arrangement according to the invention comprises at least one belt strap extending across the body of a person sitting on the seat provided with the safety belt arrangement, one end of said strap being secured to the seat of the chassis of the vehicle to that side of the seat which is opposite to the nearest side wall of the vehicle and the opposite end of said strap being connected to attachment means slideable in a guide from a front position in which the safety belt is inactive to a rear position in which the safety belt is tightened around a person sitting in the seat and vice versa.

According to other features of the invention said guide for the slideable attachment means may be provided on the inside of a door of the vehicle, means being provided for automatically displacing said attachment means toward its rear position upon the turning of the ignition key.

Figure 30:
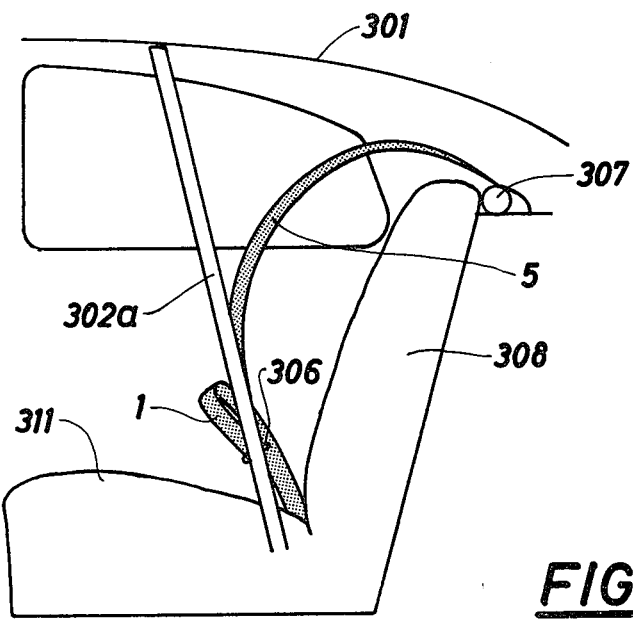

The invention will be more closely described herebelow with reference to the accompanying drawings wherein:

FIGS. 29 and 30 show a safety belt arrangement according to the invention mounted in the back seat of an automobile, In FIGS. 29 and 30 the automobile is indicated at 301. Numeral 302 indicates a guide for a slidable attachment member 3. The guide 302 extends along the side and transversely along the roof of the automobile. A portion extending along the side of the vehicle is indicated at 302a and the roof portion is indicated at 302b. The portion 302a is slightly inclined in the longitudinal direction of the vehicle as appears from FIG. 30. The safety belt is of a three point type with a lap belt portion 1 and a shoulder strap portion 5, said lap and shoulder portions being formed by a single belt which extends through an eylet 306 on the attachment member 3. The shoulder belt portion is windable on a winding up roller 307 which is secured behind the back rest 308 of the seat and the lap belt portion 1 is secured to the chassis of the vehicle. The winding up roller 307 may preferably be of such a type that winding off of the belt is prevented when the vehicle is subjected to sudden accelerations in one direction or the other. In the three point belt shown, the belt forming the belt parts 1 and 5 is preferably passing freely through the eylet 306. In case of a belt of the two point type, i. e. comprising only the shoulder belt portion 5 the outer end of the belt may of course be secured to the eyelet 306. Numeral 309 indicates an electric drive unit for the attachment member, the electric circuit of which is maintained cut off by means of a switch 310 as long as there is no load on the seat 311. The inactive position of the belt is indicated in broken lines in FIG. 29. Numeral 312 indicates a coupling member which is adapted to secure the attachment member 3 in its operative position. The coupling member 312 is preferably adapted to automatically engage the attachment 3 when the latter reaches its lower position. Numeral 313 indicates a release actuator upon the actuation of which the attachment and the coupling member 312 may be released from one another. The driving means 309 may be connected in such a manner that it automatically tends to move the attachment to its inoperative position as soon as it has been released from the coupling member 312 secured to the chassis. It may also be so arranged that the attachment automatically moves to its operative position as soon as the ignition key is turned or the door to the vehicle is closed or the like. If the switch 310 is connected in series with the electric drive motor for the attachment member the latter will stay in its inoperative position that is in the upper position as long as the seat is not loaded and the switch cosequently is open.

The last described embodiment may also be adapted for mounting in the front seat of an automobile.

I claim:

1. A safety belt arrangement for vehicles comprising in combination a vehicle having seats, side walls and a roof, a safety belt, a guide rail extending as well in the vertical direction along one of said side walls of the vehicle as the transverse direction of said vehicle along the roof of said vehicle, a slide connected to said belt and being displaceably mounted on said guide rail, an electric drive motor operatively connected to said slide, an electric circuit for said electric motor, a switch in said circuit capable of sensing the load on one seat of said vehicle, an attachment means which being provided comparatively far to the middle of said seat in said transverse direction of said vehicle, and at least one belt part of said safety belt extending between said slide and said attachment means, whereby said belt part is placed across the person sitting on said seat provided with the safety belt arrangement when said attachment slide is displaced from the upper, inner portion of said guide to the outer, lower portion thereof by said drive motor which in turn is activated by said load sensing switch.

2. A safety belt arrangement as claimed in claim 1, wherein said guide rails vertical direction along the side wall of said vehicle is directed diagonally backwards and downwards of said side wall.

3. A safety belt arrangement as claimed in claim 1, wherein said belt is of the three point type with the portions thereof forming a V at the point of connection of said belt to said slide.

4. A safety belt arrangement as claimed in claim 1, wherein said belt has an upper band portion, a winding up roll connected to said upper band portion and being sensitive to sudden speed variations of the vehicle.

5. A safety belt arrangement as claimed in claim 1, including coupling means on said vehicle side wall capable of retaining said slide in its lower position which corresponds to the operative position of said belt.

* * * * *